(12) United States Patent
Kurukchi et al.

(10) Patent No.: US 9,677,830 B2
(45) Date of Patent: Jun. 13, 2017

(54) GAS DISTRIBUTOR FOR HEAT EXCHANGE AND/OR MASS TRANSFER COLUMN

(71) Applicant: Technip Process Technology, Inc., Houston, TX (US)

(72) Inventors: Sabah Kurukchi, Houston, TX (US); Kenneth Edward Krug, Houston, TX (US); Kenneth Jack Fewel, Jr., Houston, TX (US)

(73) Assignee: Technip Process Technology, Inc., Houston, TX (US)

( * ) Notice: Subject to any disclaimer, the term of this patent is extended or adjusted under 35 U.S.C. 154(b) by 0 days.

(21) Appl. No.: 15/202,849

(22) Filed: Jul. 6, 2016

(65) Prior Publication Data

US 2016/0313077 A1    Oct. 27, 2016

Related U.S. Application Data

(62) Division of application No. 14/603,511, filed on Jan. 23, 2015, now Pat. No. 9,410,750.

(51) Int. Cl.
*B01F 3/04* (2006.01)
*F28F 25/10* (2006.01)
(Continued)

(52) U.S. Cl.
CPC ............. *F28F 25/10* (2013.01); *B01D 3/008* (2013.01); *B01D 3/32* (2013.01); *B01F 3/04078* (2013.01); *B01F 3/04468* (2013.01); *B01F 3/04496* (2013.01); *C10G 11/18* (2013.01); *F28C 1/02* (2013.01); *F28F 25/08* (2013.01)

(58) Field of Classification Search
CPC .......... B01D 1/305; B01D 3/008; B01D 3/30; B01D 3/32; B01D 45/12; B01D 45/16; B01F 3/04; B01F 5/0057; B01F 15/0203; B01F 3/04078; B01F 3/04468;
(Continued)

(56) References Cited

U.S. PATENT DOCUMENTS

| 2,591,343 A * | 4/1952 | Eld | B01D 3/22 261/113 |
| 3,175,340 A * | 3/1965 | Schulze | B01D 47/027 261/117 |

(Continued)

OTHER PUBLICATIONS

McPherson, L.J., "Causes of FCC Reactor Coke Deposits Identified," Oil &Gas Journal, Sep. 10, 1984, pp. 139-143.
(Continued)

*Primary Examiner* — Charles Bushey
*Assistant Examiner* — Scott Bushey
(74) *Attorney, Agent, or Firm* — Locke Lord LLP; Alan B. Clement; Peter J. Fallon

(57) ABSTRACT

The present invention relates to a device that conditions high entrance velocity, superheated feed gas, which include some high boiling components, for example, asphaltenes and poly-nuclear aromatics that tend to coke upon condensation and exposure to the superheated feed gas temperature. Also included in superheated feed gas are solid catalyst fines, from a single or multiple feed nozzles to a quiescent flow regime for uniform distribution of the gases, to a contact device within the Main Fractionator (MF) column.

21 Claims, 17 Drawing Sheets
(5 of 17 Drawing Sheet(s) Filed in Color)

(51) Int. Cl.
  *F28F 25/08* (2006.01)
  *B01D 3/00* (2006.01)
  *C10G 11/18* (2006.01)
  *B01D 3/32* (2006.01)
  *F28C 1/02* (2006.01)

(58) Field of Classification Search
  CPC ....... B01F 3/04496; F28F 25/08; F28F 25/10; F28F 25/12; C10G 11/18; F28C 1/02
  USPC .............................. 261/79.2, 96, 97, 109, 110
  See application file for complete search history.

(56) References Cited

U.S. PATENT DOCUMENTS

| | | | |
|---|---|---|---|
| 3,348,364 A | 10/1967 | Henby | |
| 3,651,619 A | 3/1972 | Miura | |
| 3,687,630 A * | 8/1972 | Tailor | B01D 45/12 423/243.01 |
| 3,916,021 A | 10/1975 | Hajek et al. | |
| RE28,616 E * | 11/1975 | Yankura | B01D 47/00 165/60 |
| 3,917,458 A | 11/1975 | Polak | |
| 3,925,039 A * | 12/1975 | Ziegler | B01D 47/10 261/79.2 |
| 4,351,803 A | 9/1982 | Olson | |
| 4,435,196 A | 3/1984 | Pielkenrood | |
| 4,571,311 A * | 2/1986 | Ferguson, Jr. | B01F 5/0057 159/4.01 |
| 4,619,404 A * | 10/1986 | Rasmussen | B05B 7/0075 239/424 |
| 5,106,544 A | 4/1992 | Lee et al. | |
| 5,558,818 A * | 9/1996 | Gohara | B01F 5/04 261/109 |
| 5,605,654 A | 2/1997 | Hsieh et al. | |
| 5,632,933 A | 5/1997 | Yeoman et al. | |
| 6,309,553 B1 | 10/2001 | Lanting et al. | |
| 6,341,765 B1 | 1/2002 | Moser | |
| 6,889,961 B2 | 5/2005 | Laird et al. | |
| 6,889,962 B2 | 5/2005 | Laird et al. | |
| 6,948,705 B2 * | 9/2005 | Lee | B01D 3/008 261/109 |
| 6,997,445 B2 | 2/2006 | Vedrine | |
| 7,104,529 B2 * | 9/2006 | Laird | B01D 3/008 261/79.2 |
| 7,281,702 B2 | 10/2007 | Jacobs et al. | |
| 7,459,001 B2 | 12/2008 | Christiansen et al. | |
| 7,744,067 B2 * | 6/2010 | Kurukchi | B01D 1/0017 210/787 |
| 8,025,718 B2 | 9/2011 | Kooijman | |
| 8,286,952 B2 * | 10/2012 | Lee | B01D 3/008 261/109 |
| 8,888,076 B2 * | 11/2014 | Tamminen | B01D 3/008 261/109 |
| 2003/0188851 A1 | 10/2003 | Laird et al. | |
| 2005/0029686 A1 * | 2/2005 | Laird | B01D 3/008 261/96 |
| 2005/0146062 A1 | 7/2005 | Laird et al. | |
| 2007/0251384 A1 | 11/2007 | Kurukchi et al. | |
| 2008/0053814 A1 * | 3/2008 | Monkelbaan | B01D 3/008 202/262 |
| 2015/0000524 A1 | 1/2015 | Davydov et al. | |

OTHER PUBLICATIONS

Lieberman, N.P., "Shot Coke: its origins and prevention," Oil & Gas Journal, Jul. 8, 1985, pp. 45-46.
NPRA Question and Answer Session, "Heavy Oil Processing" 1986 (Transcripts), Question 12, pp. 45-47.
Dean, C. et al., "FCC reactor vapour line coking," Autumn (2003), pp. 3-4 and 6-7.
Dean, Christopher et al., "Process Equipment Specification and Selection," Petroleum Technology Quarterly Autumn 2004, pp. 13-19.
Hanson, D.W. et al., "De-entertainment and washing of flash-zone vapors in heavy oil fractionators," Hydrocarbon Processing, Jul. 1999, pp. 55-60.
Golden, S.W. et al., "Correcting design errors can prevent coking in main fractionators," Oil & Gas Journal, Nov. 21, 1994, pp. 72, 75-80 and 82.
Laird, D.G., "Benefit of revamping a main fractionator," Petroleum Technology Quarterly, Winter 2005, pp. 29-31, 33, 35-36.
Hunt, D. et al., "Minimising FCC slurry exchanger fouling," Petroleum Technology Quarterly, Winter 2008, pp. 1-7.
Pilling, M. et al., "Entrainment issues in vacuum column flash zones," Petroleum Technology Quarterly, Winter 2010, pp. 1-10.
PCT Notification of Transmittal of the International Search Report and the Written Opinion of the International Searching Authority, or the Declaration dated Jun. 9, 2016 corresponding to International Application No. PCT/US16/14468 filed Jan. 22, 2016 (14 pages).

* cited by examiner

GAS DISTRIBUTOR FOR HEAT EXCHANGE AND/OR MASS TRANSFER COLUMN

CROSS REFERENCES TO RELATED APPLICATIONS

This application is a divisional application of U.S. patent application Ser. No. 14/603,511, filed on Jan. 23, 2015, now U.S. Pat. No. 9,410,750, the entire contents of which are incorporated herein by reference.

TECHNICAL FIELD

The present invention relates generally to a gas distributor of "F-Flute" design that provides uniform gas flow in a heat exchange and/or mass transfer column, and specifically to a gas distributor that provides uniform gas flow to the trays or packing of a Main Fractionator (MF) column in a fluid catalytic cracking unit (FCCU) facility.

BACKGROUND

Providing uniform vapor distribution in high capacity fractionation towers is one of the most challenging aspects of designing a high performance column. Conventional devices within the industry have attempted to evenly distribute the inlet feed gas to the section directly above the feed nozzle in MF columns. For example, the Vapor Horn and the Schoepentoeter, are proprietary vapor inlet horn and vane type inlet devices, respectively, which introduce gas/liquid mixtures into a vessel or column. However, these devices proved to be problematic because as the feed gas cools inside both devices, the heaviest components, e.g., asphaltenes, start condensing and deposit or stick to the cool surfaces of the apparatus. With further and continuous contact of the hot feed gas there is stripping of the lighter material from the deposit, as well as stripping of hydrogen atoms from the polymerized asphaltenes causing it to turn to coke. With time, the coke deposit grows to significant size and caused interference with the flow of gas and, as a result, the devices have to be taken out of the MF columns.

Typical prior art devices that have tried to address the problem of ensuring good mixing and even distribution are disclosed in the following: U.S. Pat. No. 8,286,952 to Lee et al. discloses a vapor distributor for gas-liquid contacting column; U.S. Pat. No. 8,025,718 to Kooijman et al. discloses a Fluid Inlet Device; U.S. Pat. No. 7,744,067 to Kurukchi et al. discloses a three phase vapor distributor; U.S. Pat. No. 7,459,001 to Christiansen et al. discloses a vane diffuser; U.S. Pat. No. 7,281,702 to Jacobs et al. discloses methods and an apparatus for mixing and distributing fluids; U.S. Pat. No. 7,104,529 to Laird et al. describes a vapor distributor apparatus, the vapor horn of which includes a series of vanes the sizes of which increase with distance from the inlet nozzle of the vapor distributor, U.S. Pat. No. 6,997,445 discloses a method and device for introducing a liquid-vapor mixture into a radial feed cylindrical fractionating column; U.S. Pat. No. 6,948,705 to Lee et al. describes a gas-liquid contacting apparatus in which a gas stream, for example steam, is fed into a column via an annular vapor horn; U.S. Pat. No. 6,889,961 to Laird et al. described a modified vapor distributor with baffles in the lower intermediate transitional section to reduce swirling of the feed and thereby improve distribution; U.S. Pat. No. 6,889,962 to Laird et al. disclosed an annular inlet vapor horn that circulates the inlet feed so as to de-entrain any liquid droplets while providing for more even distribution of the inlet flow across the column; U.S. Pat. No. 6,309,553 to Lanting et al. discloses a phase separator having multiple separation units, upflow reactor apparatus, and methods for phase separation; U.S. Pat. No. 6,341,765 to Moser discloses a method for the infeed of a fluid into an apparatus; U.S. Pat. No. 5,632,933 to Yeoman et al. describes an annular bi-directional gas flow device having a plurality of outlets at an inner wall of the housing and a series of flow directing vanes for distribution of an inlet vapor stream across the breadth of a column; U.S. Pat. No. 5,605,654 to Hsieh et al. disclosing a vapor distributor having an annular housing with a series of ports for feeding the vapor stream in a distributed manner; U.S. Pat. No. 5,558,818 to Gohara et al. discloses a wet flue gas scrubber having an evenly distributed flue gas inlet; U.S. Pat. No. 5,632,933 to Yeoman discloses a method and apparatus for vapor distribution in mass transfer and heat exchange columns; U.S. Pat. No. 5,106,544 to Lee et al., which describe a combination of an inlet horn having a 360 degree annular housing with directional flow vanes; U.S. Pat. No. 4,435,196 to Pielkenrood discloses a multiphase separator for treating mixtures of immiscible gaseous, liquid and/or solid components, comprising a gas-tight and pressure-proof tank; U.S. Pat. No. 3,651,619 to Miura discloses an apparatus for the purification of gas; and U.S. Pat. No. 3,348,364 to Henby discloses a gas scrubber with a liquid separator.

Some other prior art devices that have tried to address the above-referenced problems include the following: U.S. Published Application 2005/0146062 to Laird et al. discloses a method and apparatus for facilitating uniform vapor distribution in mass transfer and heat exchange columns; U.S. Published Application 2005/0029686 to Laird et al. discloses a fluid stream feed device for a mass transfer column; and U.S. Published Application 2003/0188851 to Laird et al. discloses a method and apparatus for uniform distribution in mass transfer and heat exchange columns.

Additional prior art references in this regard include: McPherson, L. J.: "Causes of FCC Reactor Coke Deposits Identified"; O&GJ, Sep. 10, 1984, pp 1 39; NPRA Question and Answer Session, 1986, (Transcripts) Heavy Oil Processing, Question 12, pp 45; Lieberman, N. P.: "Shot Coke: its origins and prevention": O&GJ, Jul. 8, 1985. pp 45; Christopher Dean et. al. "FCC Reactor Vapor Line Coking," Petroleum Technology Quarterly Autumn 2003; Christopher Dean et. al. "Process Equipment Specification and Selection," Petroleum Technology Quarterly Autumn 2004; Hanson D. W. et. al. "De-Entrainment and Washing of Flash-Zone Vapor in Heavy Oil Fractionators," HCP, July 1999, 55-60; Scott W. Golden et. al. "Correcting Design Errors can Prevent Coking in Main Fractionators," Oil & Gas J. Nov. 21, 1994, 72-82; Dana G. Laird. "Benefit of Revamping a Main Fractionator," Petroleum Technology Quarterly; Winter 2005. David Hunt et. al.; "Minimizing FCC Slurry Exchanger Fouling," Petroleum Technology Quarterly Winter 2008; Mark Pilling et. al.; "Entrainment Issues in vacuum Column Flash Zones," Petroleum Technology Quarterly; Winter 2010.

It is worth noting that in the majority of devices utilizing a vapor horn the inlet flow is unidirectional with a cyclonic effect on the vapor feed. In these types of devices, baffles or vanes are used to redirect or disrupt the circular flow of the inlet stream.

As such, it would represent an advancement in the state of the art and resolve a long felt need in the art if a gas distributor device that could cool the high velocity super-heated feed gas to the MF column and distribute it evenly to the bottom of the slurry packed section without fouling and coke deposition inside the feed distributor device.

SUMMARY OF THE INVENTION

The present invention is directed to a gas distributor for a heat exchange and/or mass transfer column. The gas distributor is located within the column and comprises at least one feed gas inlet nozzle extending through a shell wall of the column for directing a feed gas to a substantially vertical interior cylindrical deflector wall comprising at least one opening to an annular interior open area within the gas distributor. The gas distributor further contains a bottom section that extends the interior cylindrical deflector wall and conforms to the contour of the shell wall. The bottom section comprises an opening to a column sump within the column, and there is a generally horizontal ceiling above the feed gas inlet nozzle between the interior cylindrical deflector wall and the column shell that defines a generally circumferential gas flow channel formed between the shell wall and the interior cylindrical deflector wall, said ceiling comprises at least one opening.

Additionally, the present invention is directed to a method for distributing feed gas in a heat exchange and/or mass transfer column. The method comprising the steps of: delivering a superheated feed gas through a feed gas inlet nozzle that extends through a shell wall of the column into a generally circumferential gas flow channel formed between the shell wall, an interior cylindrical deflector wall having a bottom section and at least one opening to an annular interior open area within the column, and a ceiling above the inlet nozzle between the shell wall and the interior cylindrical deflector wall said ceiling having a plurality of openings; cooling the superheated feed gas by contacting the gas with a counter current flow of liquid as the liquid passes through the plurality of openings in the ceiling and into the circumferential gas flow channel; wetting the interior cylindrical deflector wall and an interior side of the shell wall that forms the circumferential gas flow channel with the counter current flow of liquid after the liquid has passed through the plurality of ceiling openings; and venting the superheated feed gas to an area above the ceiling and the annular interior area within the column through the at least one opening of the interior cylindrical deflector wall and the plurality of openings in the ceiling to provide a substantially uniform distribution of the superheated feed gas within the column.

The claimed gas distributor is of a simple design and easily may be installed in a column to provide uniform horizontal and vertical distribution of gas entering the column. The presently claimed F-Flute gas distributor advantageously provides for: cooling of the superheated reactor multiphase feed gas inside the F-Flute gas distributor by intimate contact with the showering slurry liquid from the F-Flute gas distributor ceiling; immediate reduction of the feed gas temperature to reduce the possibility of high skin temperature of the main fractionator shell above its design temperature; the F-Flute gas distributor reduces the distance required between the feed nozzle and the slurry packed section by about 2.5 meters or more, and a shorter overall tower T-T length; using the F-Flute gas distributor in revamps is a cost effective alternative to increasing the size of both the feed nozzle and refractory lined gas transfer line; the fully wetted F-Flute gas distributor internals prevent dry hot spots that cause coke deposition and growth; the elimination of gas maldistribution to the slurry packed section, helps to distribute the liquid over the packing more evenly and results in more effective heat transfer in the slurry section, which results in shorter required slurry packed section length; and even gas distribution in the slurry packed section reduces entrainment of slurry liquid to the oil wash section, and may eliminate the need for the oil wash section all together.

BRIEF DESCRIPTION OF THE DRAWING

The patent application file contains at least one drawing executed in color. Copies of this patent or patent application publication with color drawings will be provided by the Office upon request and payment of the necessary fee.

DETAILED DESCRIPTION OF THE INVENTION

Figure 1A:
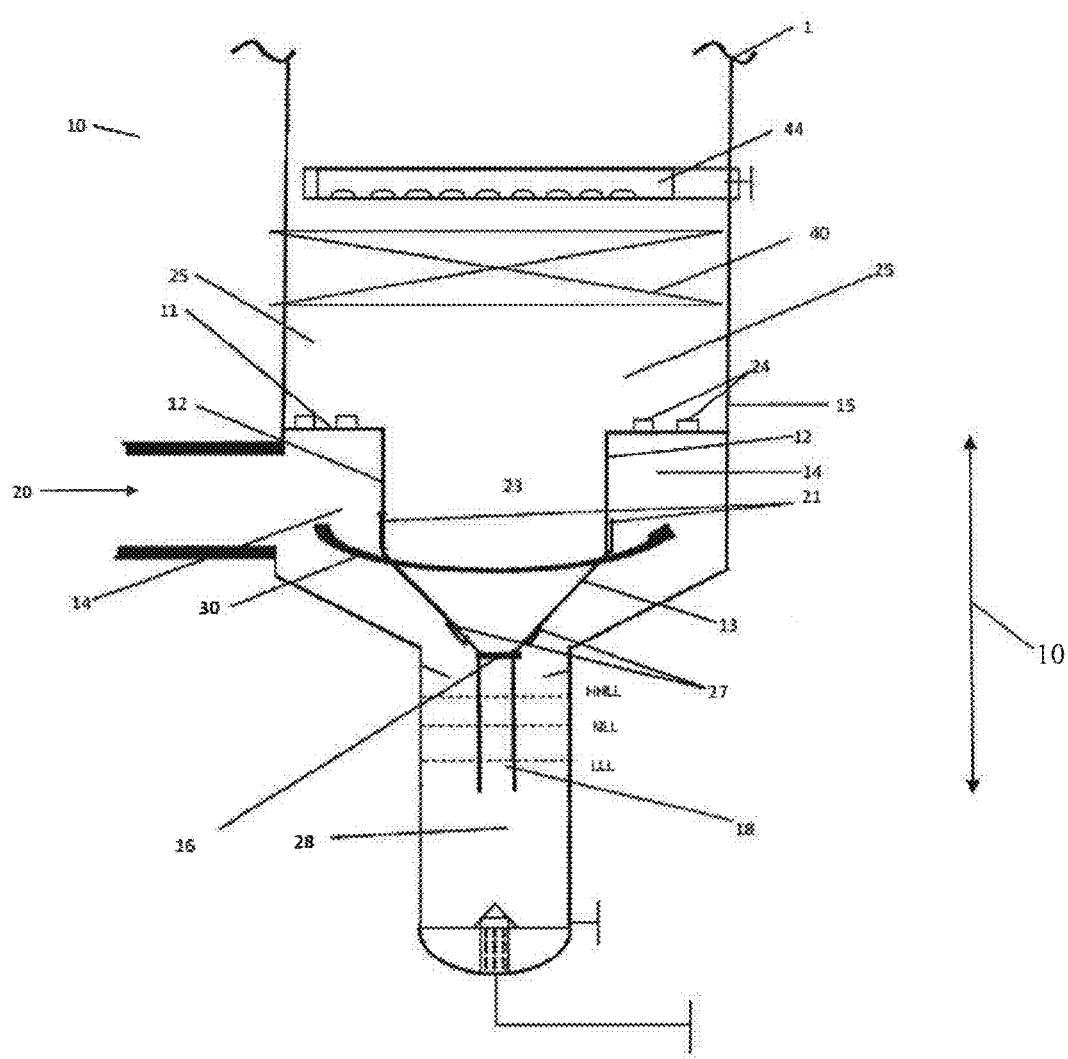
FIG. 1A is a cross-section view of an embodiment of the claimed gas distributor having an F-Flute design depicted generally within a column for heat exchange and/or mass transfer.

The present claimed invention is directed to a gas distributor for use in a heat exchange and/or mass transfer column that evenly distributes gas from a feed gas stream about the interior of the column. In particular, the present invention relates to a gas distributor that conditions a high-entrance velocity superheated feed gas stream, so that the gas from the feed gas stream is evenly distributed within the inner periphery of the column.

The claimed gas distributor is particularly efficient at avoiding coke formation when the boiling point components of FCCU reactor products are cooled very close to their dew point. These products can condense where there are cold spots, or some reaction product components can polymerize to form large molecules that become non-volatile at feed gas inlet temperatures. Cold spots can be attributed to inadequate insulation, or high heat loss near fittings such as flanges, which facilitate condensation. If these deposited liquids have sufficient residence time on the solid surfaces of the vessel, coke begins to accumulate on the inside of the transfer line and on the vessel walls. Once coke is formed, additional coke has a surface where it grows more easily.

Naphthenes in the feedstock to the FCC reactor are not efficiently cracked by the FCC catalyst, so they are carried with the hot reactor effluent gas to the MF column. FCC catalyst formulations in recent years have resulted in greater usage of high hydrogen-transfer reaction catalysts and operate at higher reactor temperature that favor the production of more olefins and in conjunction with heavier aromatic feeds, tend to produce higher boiling-point polynuclear aromatics (PNAs), which are more likely to condense at the point of entry to the MF column. Once these PNAs condense on solid surfaces inside the column, they easily form coke. High rare earth zeolite FCC catalyst tends to form aromatics from naphthenes as a result of secondary hydrogen transfer reactions. These aromatics can undergo further thermal reactions to form coke.

Coke formation has been described by the following two independent mechanisms: (i) "Asphaltic Coke" is formed as solutizing oils are thermally cracked and the remaining large asphaltene and resin molecules precipitate out to form a solid structure (coke) without much change in form; and (ii) "Thermal Coke" is produced by cross-linking of aromatic rings.

The first condensed droplets from the superheated reactor feed gas stream to the gas distributor are likely to be heavy oil rich in asphaltenes and resins. If this material reaches a rough metal surface in a low velocity area of the MF column, the long residence time there may allow the solvent oils to slowly evaporate and form coke by precipitation. Once coke deposits, it becomes an ideal site for more condensed droplets to deposit on its rough surface and cause growth of a coke site.

There are two basic principles for minimizing coke formation that are utilized in the present invention, the first is to avoid dead spots by preventing heat losses from bare metal surface, and the second is to keep solid surfaces wetted. In the instant invention, reactor effluent (i.e., superheated feed gas to the gas distributor) enters the main column and is cooled through direct contact with cold slurry pumparound. The MF column uses packing, shed (baffle), or disc and donut trays to contact the two streams, i.e., gas from the feed gas stream and slurry liquid. The packing/trays work by creating a sheet of liquid that the hot gas must pass through. Ideally, the gas and liquid are uniformly distributed. However, in practice, this uniform gas and liquid distribution does not occur. Liquid and gas distribution is generally poor, hence the packing, shed or disc and donut trays flood well below their rated capacities.

Due to maldistribution of the liquid and gas of the prior art devices, in some instances, more than 50% of the MF column inlet nozzle is blocked with coke raising gas velocity to well over 70 m/sec, which is double the design velocity. Therefore, more gas flows up the column 180 degrees from the inlet nozzle, i.e., areas in the column directly opposite the feed nozzle, which can cause localized flooding of the packing or shed (baffle) trays in the high gas velocity region. Assuming initial liquid distribution to the top packing/tray is uniform, gas temperatures leaving the packing/trays are higher at 180 degrees from the inlet nozzle due to gas maldistribution. Columns fitted with thermocouples located in the gas space above the packing/trays, which are oriented directly above and at 180 degrees from the inlet nozzle, have temperature differences up to 50° C. Once the packing trays flood, cold slurry is entrained into the wash oil trays located directly above the slurry section packing. As a result, the pressure drop across the wash oil trays increases, further impacting unit pressure balance.

The above-mentioned gas and liquid maldistribution in the slurry section above the feed gas inlet is resolved with the presently claimed F-Flute gas distributor. The instant gas distributor provides more uniform flow entering the slurry pumparound bed, withstands the high temperature erosive environment, and resists damage and coking.

Both conventional tangential distributors (e.g., Vapor Horns, Vane Inlet Devices, and V-Baffles) and radial flow multivane distributors (e.g., Schoepentoeter) have proven not to work in FCCU main fractionators due to coking, erosion, or both. Poorly designed distributors have coked to the point that gas flow was obstructed, resulting in premature shutdowns.

The inventors note the staggered pipe plate distributor is a gas distributor that can roughly distribute the gas while remaining coke free throughout the run. The staggered pipe plate distributor comprises staggered pipe placed on an oval shaped ring placed in the column at an angle to the direction of gas upflow above the feed nozzle where the feed gas and slurry liquid from the packed slurry section flow through the distributor counter currently. The success of the distributor in combating coking is due to the immediate and continuous washing action of the asphaltene droplets condensing on the distributor pipes by the flowing slurry liquid. However, this distributor provides limited improvement of gas distribution to the packed section above.

If the slurry pumparound section is designed properly, there will be very little entrainment and no need to have a wash section. However, when there is high entrainment, the correct solution is to fix the slurry pumparound section to reduce the entrainment. Thus, the wash oil section serves no purpose and can be eliminated.

There are two main mechanisms that contribute to wash oil section coking. The first is entrainment of slurry pumparound liquid into the wash oil section, and the second is local hot areas on the wash oil tray. In some cases, both occur at the same time, causing rapid coke formation and ultimately an unscheduled shutdown.

When slurry pumparound liquid becomes entrained with the gas from the pumparound section and cannot drain because the wash oil trays are heavily loaded, or blowing (i.e., high gas rate and low liquid rate) is occurring, coke is formed. Entrainment alone is not the problem, as the entrained liquid must be subjected to prolonged residence time and relatively high localized temperatures. Moreover, local temperatures can be very high at the same time that liquid flow rates are extremely low, thereby creating ideal conditions for coke to form.

Prior art devices, such as the Vapor Horn and the Schoepentoeter have not been successful in evenly distributing the feed gas stream to the section directly above the feed gas inlet nozzle in MF column. This is because as the feed gas stream cools inside these devices and the heaviest components, which included asphaltenes, start condensing and deposit/stick on the cool surfaces of the devices. By continuous contact with the hot feed gas, there is stripping of the lighter material from the deposit. Additionally, stripping of hydrogen atoms from the polymerized asphaltenes causes it to turn to coke. With time, the coke deposits grow to a significant size and cause interference with the flow of gas. As a result, the devices have to be removed from the MF columns.

In order to increase the efficiency of the heat exchange and mass transfer taking place between the gas of the feed gas stream and slurry liquid, it is important that the gas be uniformly distributed across the horizontal cross-section of the column, particularly at the lower gas-liquid interface where the gas enters the packing. When the feed gas stream is introduced from a feed gas inlet nozzle into the column below the packing without a gas distributor, the momentum of the gas can prevent the desired horizontal distribution of the gas prior to its entry into the packing.

Additionally, for optimum operation of the packed slurry section in main fractionator columns an even distribution of liquid films and gas flow through the packing is required. While the role of proper liquid distribution was never disputed, prior art devices have neglected the initial distribution of gas within the column. The importance of the initial gas distribution within the column has become more evident as large column diameters with short bottom sections and packing with lower pressure drop are considered. Thus, the instant F-Flute gas distribution system introduces, for example, the superheated FCC reactor gas (i.e., a superheated feed gas stream) into the column and distributes it evenly over the entire cross section of the column.

To achieve this, the velocity of the feed gas stream needs to be reduced over a short distance between the feed gas inlet nozzle and the packing and/or tray section above. At the same time, the feed gas inlet nozzle should not unduly block the column cross section or lead to excessive pressure drops. For economic reasons, a minimum distance between the nozzle and the packing/trays is desired, thus an efficient gas distributor device is highly desirable.

The presently claimed gas distributor provides a solution to the problems of the prior art devices. The gas distributor is for a heat exchange and/or mass transfer column. The F-Flute design provides even distribution of a superheated feed gas stream utilizing an open internal shell column having a generally vertical center axis. At least one feed gas inlet nozzle extends through the column shell wall and directs the superheated feed gas stream towards a generally annular vertical interior cylindrical deflecting wall that is spaced radially inwardly from the feed gas inlet nozzle, so that the feed gas travels in a circumferential direction. The gas distributor further comprises a ceiling and a bottom extending between the internal deflecting wall and the column shell to substantially close the top and extend the bottom of the distributor in a cylindrical or cone shape bottom section to the column sump. Thus, the F-Flute gas distributor prevents direct feed gas bypassing to the packed section above.

The claimed gas distributor has an "F-Flute" design that cools the feed gas stream by contacting it with a counter-current flow of slurry liquid from the column slurry section above the gas distributor. As such, the slurry liquid is partly vaporize upon contact with the feed gas stream causing the feed gas stream to cool. The down-flowing slurry liquid "washes" and disengages the solid catalyst fines if present in the feed gas stream.

The cooled gas of the feed gas stream leaves the F-Flute gas distributor through both vent windows in the circumferential interior cylindrical deflector wall and gas openings in the ceiling of the F-Flute gas distributor. The ceiling (i.e., roof) of the F-Flute gas distributor occupies the space between the top of the substantially vertical circumferential interior cylindrical deflector wall and the interior wall of the column shell. As such, the ceiling defines the top of a feed gas flow channel and separates the feed gas flow channel from interior full cross section open area above the F-Flute gas distributor within the column. The slurry liquid from the packed section above the interior full cross section open area partly collects on top of the ceiling to a level of about 25 mm to about 50 mm depending on the type of ceiling. By various means, as more fully described herein below, the slurry liquid cascades over or "showers" down through the feed gas stream in the feed gas flow channel.

According to an embodiment of the invention, the F-Flute gas distributor ceiling comprises perforated flat plate sections, or segments made of flat metal sheet containing a plurality of about 1 inch to about 1.5 inch perforations, i.e., holes, distributed evenly over the flat plate section. The sections or segments are designed to be fitted or connected together to form a ceiling between the generally annular circumferential interior cylindrical deflector wall and the interior side of the column shell wall. The sections forming the ceiling, for example, can be welded to a circumferential rim. The perforated flat plate sections or segments allow both the cooled gas of the feed gas stream and slurry liquid to flow through perforations (holes), with a reduction in the amount of slurry liquid that collects on the top of the ceiling. Specifically, the holes in the ceiling allow the gas and slurry liquid to alternatively pass through the same perforation and provides a quick washing effect. Any coke particles formed that otherwise would be carried with the gas are picked up by the contacting liquid and washed downward with the flowing slurry liquid. In this regard, the plurality of holes in the ceiling distribute the downwardly flowing slurry liquid in a shower type fashion and create a large surface contact area of liquid to enhance the heat/mass transfer interaction with the upwardly flowing gas of the feed gas stream. Using perforated flat plate sections reduces or minimizes the liquid hold up on the roof.

In another embodiment of the invention, the F-Flute gas distributor ceiling in addition to a plurality of holes may comprise gas chimneys that allow the cooled gas from feed gas inside the feed gas flow channel to enter the interior full cross section open area of the column above the gas distributor and below the packing tray slurry section. The chimneys in the ceiling are surrounded by the plurality of ceiling holes and the slurry liquid from the slurry packed section collects on the top of the ceiling, as the slurry liquid passes through the plurality of holes to shower the feed gas stream.

According to another embodiment of the invention, the F-Flute gas distributor ceiling can be provided with rod-plate sections or segments comprising staggered rods spaced at least about one inch apart and welded to a circumferential rim. The rod-plate sections allow both gas and slurry liquid to flow through the spacing between the staggered rods. This design forces the up-flowing gas to intimately contact the down-flowing slurry liquid, thus giving rise to froth formation on the top of the rod-plate sections, but with a minimum amount of slurry liquid collecting or holding up on top of the rods.

Yet, according to another embodiment of the invention, the F-Flute gas distributor ceiling comprises perforated corrugated plate sections or segments made of a perforated corrugated sheet metal welded to a circumferential rim. The perforations (i.e., holes) on the corrugated plate allow both gas and slurry liquid to alternatively pass through. Further, the corrugated sheet provides increased surface and open area (i.e., more holes) for both the gas and liquid to pass through the ceiling. Furthermore, the corrugated sheet minimizes the liquid collecting or holding up on the roof.

The invention further contemplates combinations of the aforementioned ceiling designs, for example, perforated corrugated plate sections with perforated flat plate sections and rod-plate sections, in addition to the chimneys. Further, the present invention differs from prior art gas distribution devices in that the presently claimed F-Flute gas distributor is constructed with metal surfaces that are extremely smooth and/or polished, as well as providing surfaces that are fully wetted with the slurry liquid to prevent coke deposition.

The F-Flute gas distributor produces a not seen before uniform and even distribution of the gas to the slurry packed section above the distributor. The advantages of the presently claimed F-Flute gas distributor can be more fully appreciated by the following description of the Figures presented herein.

FIG. 1A depicts one embodiment of the present invention. In FIG. 1A, the F-Flute gas distributor 10 is depicted generally within a column 1 for heat exchange and/or mass transfer. The column 1 can be any type of column for heat exchange and/or mass transfer, including but not limited to, main fractionators, distillation, absorption, stripping, quench oil and/or quench water towers, decoking towers and superfractionators. The column 1 can be of any desired shape, including, but not limited to circular, oval, square, rectangular or other polygonal cross section. The column 1 of FIG. 1A is an open internal shell and having a generally vertical center axis and generally annular shape. The F-Flute distributor 10 can be designed to accommodate any shape of any heat transfer and/or mass transfer column.

In FIG. 1A a feed gas flow channel 14 is formed between the interior of the shell wall 15 of the column 1, the interior cylindrical deflector wall 12, and ceiling 11. The F-Flute gas distributor 10 further comprises a bottom section 13 that can be cone shape to accommodate the contour of the column shell wall 15. A high velocity superheated feed gas 30 is introduced into the feed gas flow channel 14 through at least one gas inlet nozzle 20 in a direction generally perpendicular to the height of the column 1. The superheated feed gas 30 flow travels through feed gas flow channel 14 circumferentially along the generally cylindrical exterior column shell wall 15 of column 1 due to centrifugal forces and the high rate at which the superheated feed gas 30 is introduced into the F-Flute gas distributor 10.

The interior cylindrical deflector wall 12 and ceiling 11 of the F-Flute gas distributor 10 may be constructed of any high temperature steel material suitable for the heat and/or mass transfer processes that will not be susceptible to degradation from high velocity superheated gas 30 flow of volatile chemicals, liquids and solid particulates, as is well known to those skilled in the art.

As shown in FIG. 1A, the superheated feed gas 30 flows circumferentially around gas flow channel 14 within F-Flute gas distributor 10. The superheated feed gas 30 from gas inlet nozzle 20 flows through gas flow channel 14 in which solids and liquids are separated as the superheated gas is cooled. The gas of superheated feed gas 30 is removed from the feed gas flow channel 14 by multiple means. The first means comprises vent windows 21 provided in the interior cylindrical deflector wall 12. The vent windows 21 allow the cooled gas to exit the feed gas flow channel 14. In an embodiment of the invention, the number of vent windows 21 ranges from about 10 to about 30. The vent windows 21 can be any size up to about 1 meter×0.6 meters. The gas exiting the feed gas flow channel 14 via the vent window 21 flows into an interior open area 23 formed by the cylindrical shape of the interior cylindrical deflector wall 12 and annular construction of the F-Flute gas distributor 10. The gas then proceeds upwardly to the interior full cross section open area 25 of the column 1 as well as the contact packing and/or trays 40 of the column 1 located above the F-Flute gas distributor 10.

Additional means shown in FIG. 1A by which the gas from the superheated feed gas 30 is separated and directed into the interior full cross section open are 25 of the column 1 above the F-Flute gas distributor 10 are located in the ceiling 11 of the F-Flute gas distributor 10. According to one embodiment of the invention, the ceiling 11 comprises chimneys 24 which allow the cooled gas from the superheated feed gas 30 proceeds upwardly to the interior full cross section open area 25 of column 1 and contact packing and/or trays 40 of the column 1 located above the F-Flute gas distributor 10.

The chimneys 24 can be equipped with high hats 41 (see FIG. 1C) to regulate the rate at which gas from multiphase superheated feed gas 30 is allowed to leave gas flow channel 14 through chimneys 24. According to an embodiment of the invention, the number of chimneys 24 ranges from about 1 to about 3 per meter of length of the feed gas flow channel 14. The chimneys 24 have a cross sectional area ranging from about 0.1 to about 0.4 $m^2$ and the high hats 41 are constructed from about 100 mm to about 300 mm above the chimneys 24 and have a cross sectional area ranging from about 0.1 to about 0.4 $m^2$ or larger.

FIG. 1A displays the cone shape bottom section 13 of the F-Flute gas distributor 10 which comprises a bottom section opening 16 and at least one overflow opening 27 that feeds into the column sump 28 of the column 1 located directly below the F-Flute gas distributor 10. The overflow openings 27 provide for drainage of liquid that has been separated from the gas in and above the interior open area 23 into the column sump 28. According to an embodiment of the invention, the number of overflow openings 27 ranges from about 4 to about 6. The overflow openings 27 are sized to accommodate all liquid showering or raining into the interior open area 23 of the F-Flute gas distributor 10 and acting as an overflow spillway in case the drain pipe 18 in fluid communication with bottom section opening 16 becomes clogged. FIG. 1A further displays marking indicating high high liquid level (HHLL), normal liquid level (NLL), and low liquid level (LLL) positions.

Figure 1B:
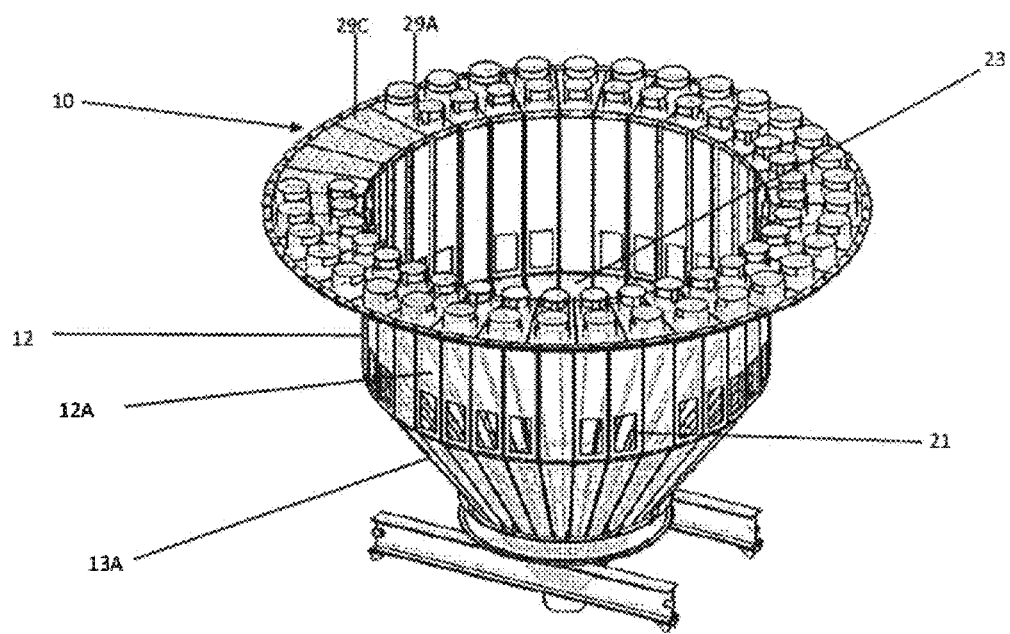
FIG. 1B is an isometric 3D view of the F-Flute gas distributor and displays an embodiment of the invention having perforated flat plate ceiling sections and perforated flat plate with chimneys and high hats ceiling sections, as well as the interior cylindrical deflector wall segments, vent windows, and the bottom section that extends the interior cylindrical deflector wall.

FIG. 1B is an isometric 3D view of the F-Flute gas distributor 10 outside of the column 1, including the ceiling 11, which comprises ceiling sections 29A, and 29C (29B, 29D not shown in FIG. 1B), the interior cylindrical deflector wall 12 comprised of wall segments 12A connected together by conventional techniques known to those of ordinary skill in the art in an annular fashion to provide interior cylindrical deflector wall 12. FIG. 1B further displays the cone shape bottom section 13 of the F-Flute gas distributor 10. In an embodiment of the present invention, the interior cylindrical deflector wall 12 comprises wall segments 12A that are sized to provide widths that can pass through a given manway. Vent windows 21 are located in several wall segments 12A around the interior cylindrical deflector wall 12. Vent windows 21 can be cut into the wall segments 12A or into the interior cylindrical deflector wall 12. When segments 12A are used to provide the interior cylindrical deflector wall 12 they continue in an annular fashion including vent windows 21 until they form the interior open area 23 of the F-Flute gas distributor 10. The segments 12A that make up the feed gas flow channel 14 are generally uniform in size, i.e., height and width.

FIG. 1B shows the ceiling 11 comprising ceiling sections 29A, 29C that can comprise one or more of solid sheet metal (not shown), a metal perforated flat plate section 29C, and perforated flat plate section with chimneys and high hats 29A (see also FIG. 1C) that allow the gas to flow out of the F-Flute gas distributor 10 and into the interior full cross section open area 25 of the column 1.

Figure 1C:
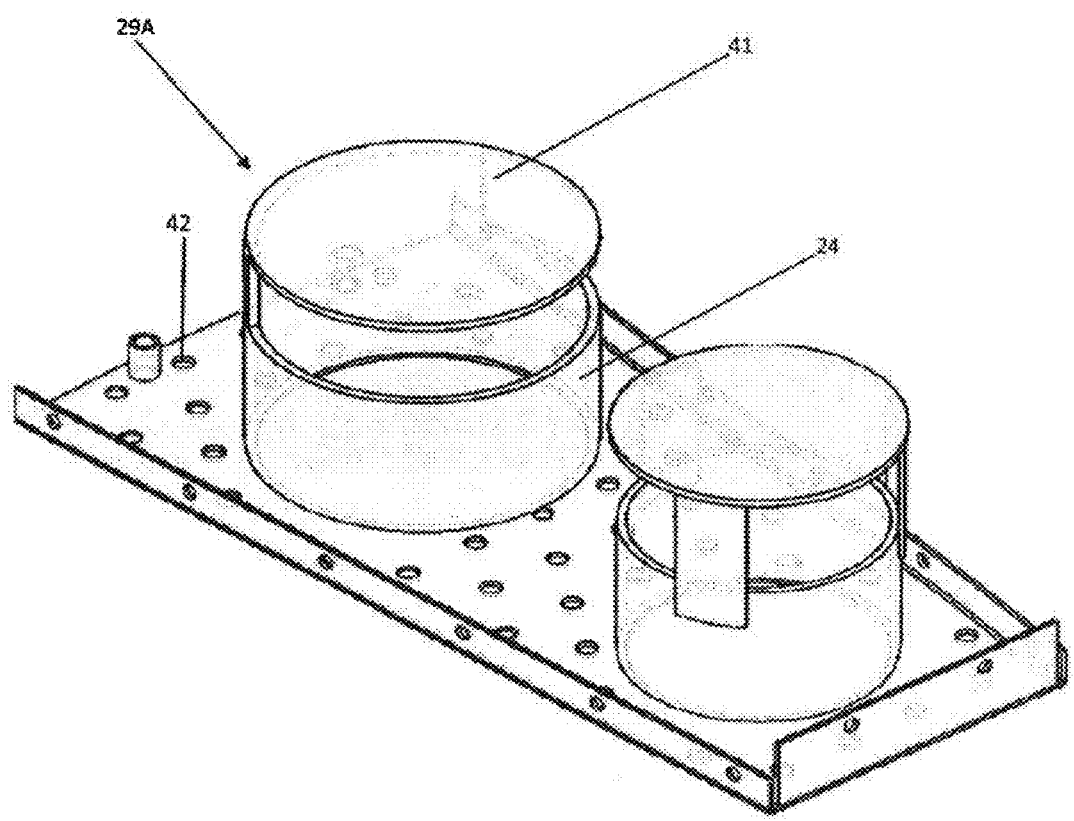
FIG. 1C is a 3D view of the perforated flat plate with chimneys and high hats ceiling section of an embodiment of the claimed F-Flute gas distributor.

Each perforated flat plate section with chimneys and high hats 29A as presented in FIG. 1C is furnished with at least two chimneys 24 and a plurality of perforations, i.e., holes 42. The holes 42 are drilled between the chimneys and sized to hold-up just enough liquid to create a gas seal.

In FIG. 1A and FIG. 1B, the cone shape bottom section 13 of the F-Flute gas distributor 10 is conically shaped to accommodate the lower portion of column 1 and feeds into column sump 28. Further, the cone shape bottom section 13 can comprise bottom section segments 13A that are connected together and extend interior cylindrical deflector wall 12 in a fashion that forms a conical shape to the lower portion of the feed gas flow channel 14 while further accommodating the shape of the column 1. Although bottom section 13 of the F-Flute gas distributor 10 is cone shaped, as depicted as in FIGS. 1A and 1B, it is contemplated that any shape required to accommodate the lower portion of the heat exchange and/or mass transfer column and extend the interior cylindrical deflector wall 12 to feed liquids and solid particles to the column sump can be used. The segments of cone shape bottom section 13 are sized to provide widths that can pass through a manway.

The cone shaped bottom section 13 serves two purposes: to prevent the gas from feed gas inlet nozzle 20 from bypassing the F-Flute gas distributor 10 openings, i.e., the vent windows 21 and chimneys 24; and to facilitate the draining of the drops to the interior open area 23 of the F-Flute gas distributor 10 to the column sump 28 without possibility of liquid entrainment. In other words, the gas is separated from the drops falling outside the F-Flute gas distributor. The cone shape follow the contour of the tower swage section, allowing quick draining of liquid and help prevent re-entrainment of liquid into the vapor stream.

According to an embodiment of the invention, the superheated feed gas 30 is cooled as it circulates inside the F-Flute gas distributor 10 feed gas flow channel 14 by the countercurrent flow of "drops" of the slurry liquid from the column slurry section liquid falling from holes 42 in the ceiling sections. This effect provides greater heat transfer inside the F-Flute gas distributor 10 when compared to a column that does not contain a gas distributor because: (i) the velocity of the superheated feed gas 30 inside the F-Flute gas distributor 10 is higher than the velocity of the gas in the column (this effect of increased velocity of the superheated feed gas 30 past the slurry liquid drops improves heat transfer rates); (ii) this higher velocity and turbulence of the superheated feed gas 30 tends to aerodynamically breakup the slurry liquid drops inside the F-Flute gas distributor 10, increasing their interfacial surface area for heat and mass transfer; (iii) the F-Flute gas distributor 10 provides greater wetted surface area for greater convective heat transfer; and (iv) the F-Flute gas distributor 10 creates an even distribution of gas to the packing, and prevents the segregation of liquid drops and gas caused by the nozzle jetting into an empty tower. The beneficial result of all these advantages is that the F-Flute gas distributor increases the heat transfer rate from gas to the slurry liquid drops and this allows a smaller length of tower/column for a given amount of heat and mass transfer.

Figure 2A:
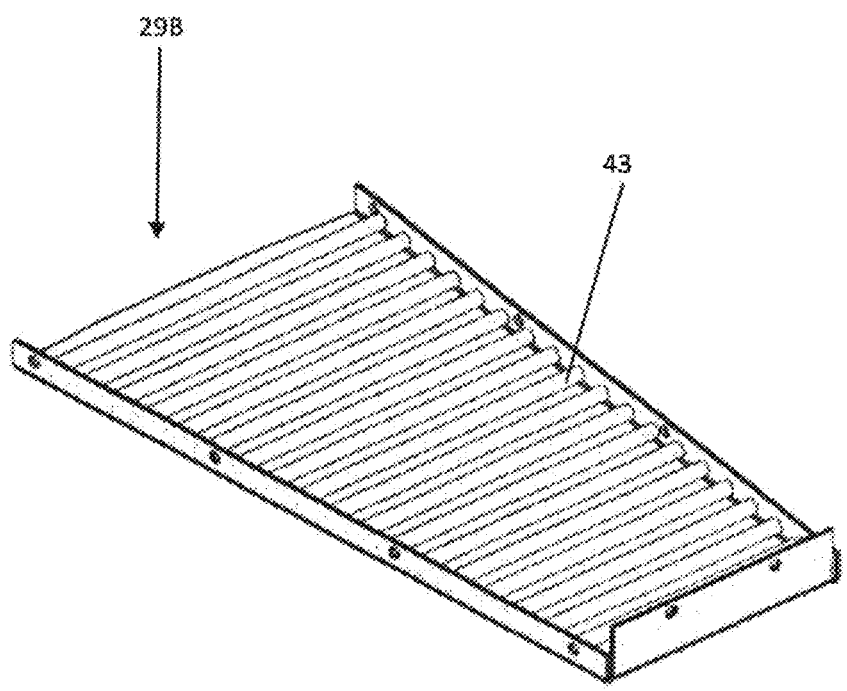
FIG. 2A is a 3D view of the rod-plate ceiling section of an embodiment of the claimed F-Flute gas distributor.
Figure 2B:
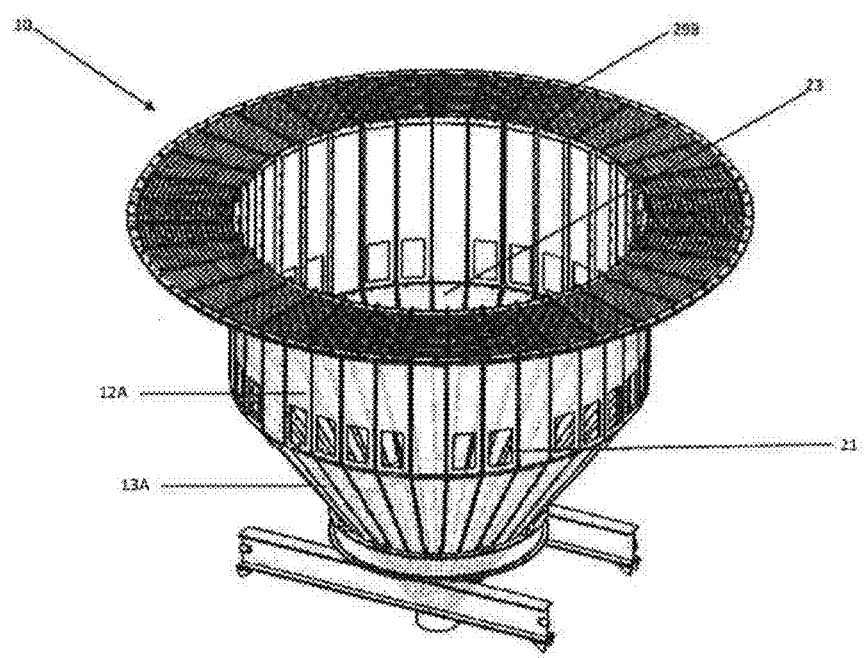
FIG. 2B is an isometric 3D view of the F-Flute gas distributor and displays an embodiment of the invention having rod-plate ceiling sections, as well as the interior cylindrical deflector wall segments, vent windows, and the bottom section that extends the interior cylindrical deflector wall.

Alternatively, the present invention F-Flute gas distributor's 10 ceiling 11 can be made up of rod-plate sections 29B as presented in FIG. 2A. The rod-plate section 29B as presented in FIG. 2A comprises staggered rods 43 that are spaced at a minimum of about 1 to about 1½ inches apart and can be welded to a circumferential rim. The staggered rods 43 can be positioned in one or various combinations of patterns, e.g., herringbone, diagonal, etc., as presented in FIG. 2B. The rod-plate sections 29B allow both the gas and the slurry liquid to flow through the spacing between the rods. This forces the up-flowing gas from feed gas flow channel 14 to intimately contact the down-flowing slurry liquid, thus giving rise to froth formation on top of the rod-plate sections 29B. There is a small amount of slurry liquid hold up on the staggered rods 43. However, the ceiling design of FIG. 2B reduces the slurry liquid hold up on the ceiling section compared to that of the perforated flat plate section with chimneys and high hats presented in FIG. 1B.

Figure 3A:
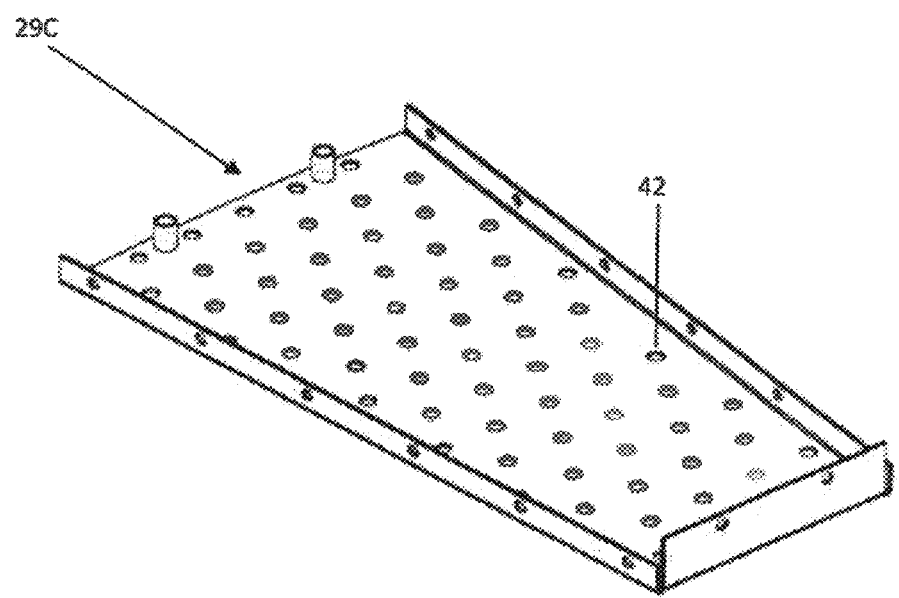
FIG. 3A is a 3D view of the perforated flat-plate ceiling section of an embodiment of the claimed F-Flute gas distributor.

FIG. 3A presents another alternative to the F-Flute gas distributor 10, wherein the ceiling section comprises perforated flat plate sections 29C. The perforated flat plate sections 29C are perforated with holes 42. The perforated flat plate sections 29C can be made of sheet metal and welded to a circumferential rim. The holes 42 in the perforated flat plate section 29C allow both gas and slurry liquid to alternatively pass through. The countercurrent flow of gas and liquid alternatively through the same perforations provide quick washing effect of any coke particles formed and carried with the gas. The solid particles are picked up by the contacting liquid and washed downward with the flowing slurry liquid. The perforated flat sheet sections 29C, as presented in FIG. 3B, are the simplest to construct and provide minimized liquid hold up on the top of ceiling 11.

Figure 3B:
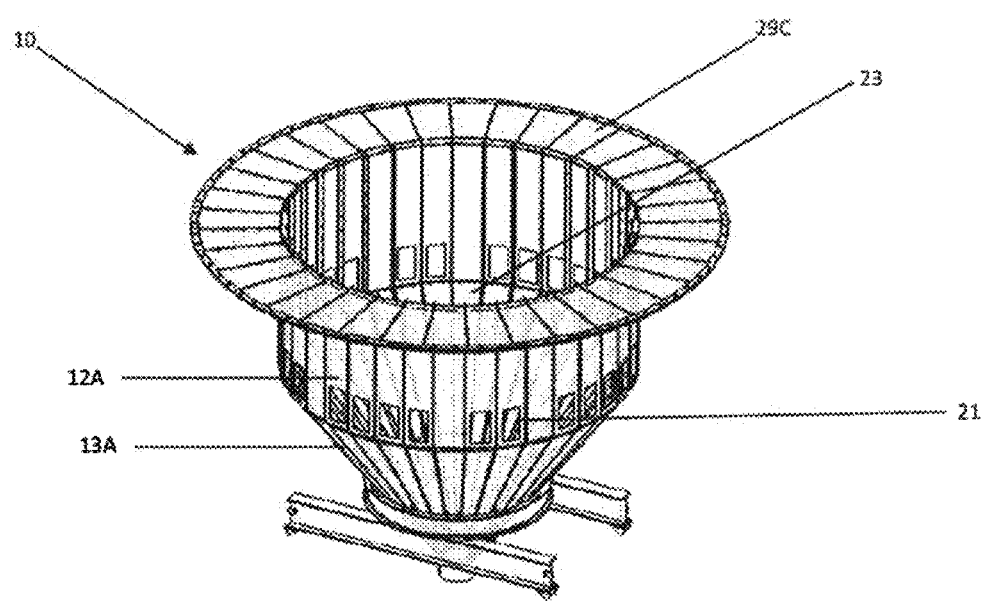
FIG. 3B is an isometric 3D view of the F-Flute gas distributor and displays an embodiment of the invention having perforated flat-plate ceiling sections, as well as the interior cylindrical deflector wall segments, vent windows, and the bottom section that extends the interior cylindrical deflector wall.

FIG. 3B is an isometric 3D view of the F-Flute gas distributor 10 outside of the column 1, including the ceiling 11, which comprises ceiling section 29C (29 A, 29B, 29D not shown in FIG. 3B), the interior cylindrical deflector wall 12 comprised of wall segments 12A connected together by conventional techniques known to those of ordinary skill in the art in an annular fashion to provide interior cylindrical deflector wall 12. FIG. 3B further displays the cone shape bottom section 13 of the F-Flute gas distributor 10. the interior cylindrical deflector wall 12 comprises wall segments 12A, vent windows 21 are located in several wall segments 12A around the interior cylindrical deflector wall 12. The segments 12A that make up the feed gas flow channel 14 are generally uniform in size, i.e., height and width and allow gas to enter the interior open area 23.

Figure 4A:
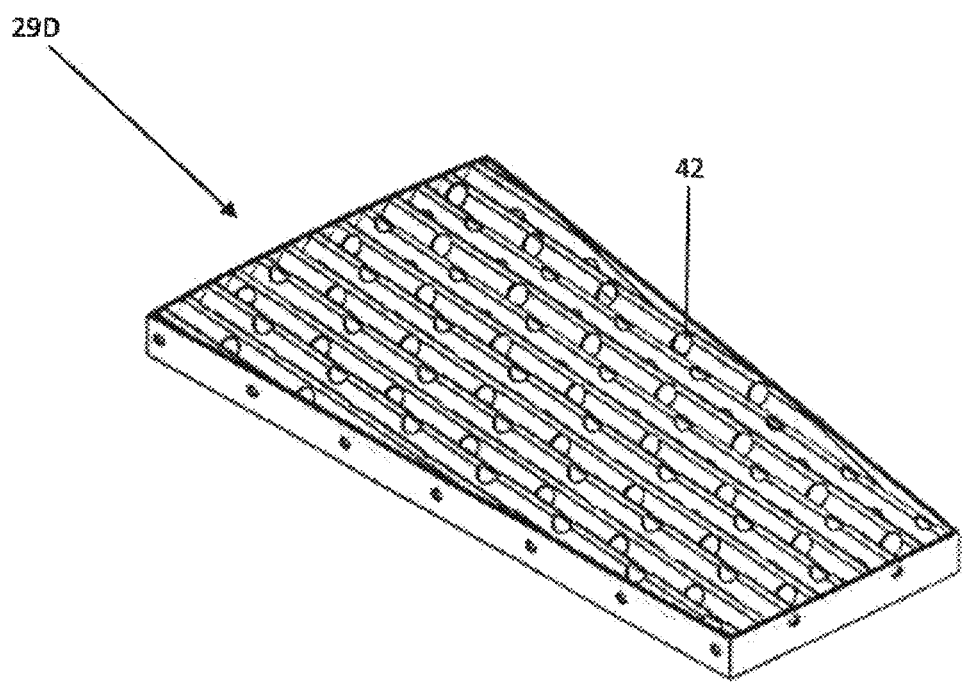
FIG. 4A is a 3D view of the perforated corrugated plate ceiling section of an embodiment of the claimed F-Flute gas distributor.
Figure 4B:
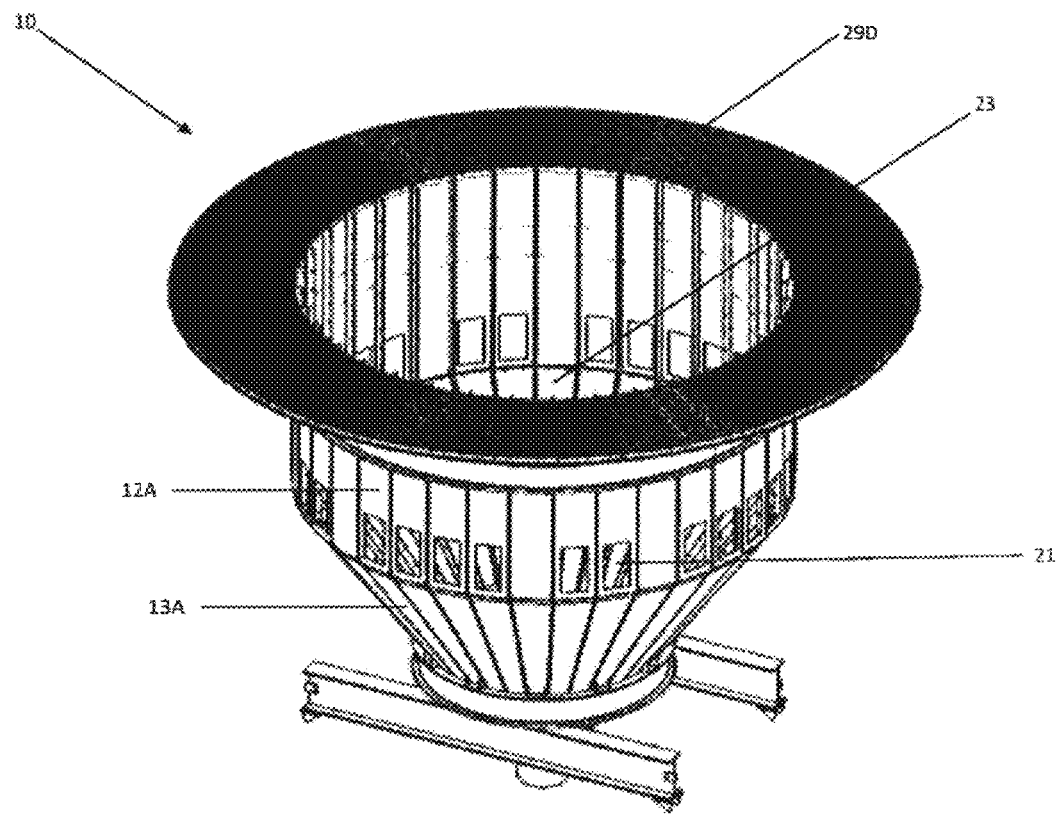
FIG. 4B is an isometric 3D view of the F-Flute gas distributor and displays an embodiment of the invention having perforated corrugated plate ceiling sections, as well as the interior cylindrical deflector wall segments, vent windows, and the bottom section that extends the interior cylindrical deflector wall.

FIG. 4A presents yet another alternative type of F-Flute gas distributor 10 ceiling 11 containing perforated corrugated plate sections 29D. In FIG. 4A, the perforated corrugated plate sections 29D are made of sheet metal and can be welded to a circumferential rim. The perforations (i.e., holes 42) on the corrugated plate allow both gas and slurry liquid to alternatively pass through. The perforated corrugated plate sections 29D corrugated sheet provides increased effective area for both the gas and liquid to pass through the roof. The countercurrent flow of gas and liquid alternatively through the same corrugation holes provide quick washing effect of any coke particles formed and carried with the gas. Such particles are picked up by the contacting liquid and washed downward with the flowing slurry liquid to the column sump 28. Also, the perforated corrugated plate sections 29D minimizes the liquid hold up on the roof. This type of F-Flute gas distributor 10 as presented in FIG. 4B, with perforated corrugated plate sections 29D represent a preferred option for use in a main fractionator column, as it offer the highest resistance to fouling with coke.

The presently claimed F-Flute gas distributor 10 invention can use of any combination of the afore described ceiling sections.

Figure 5:
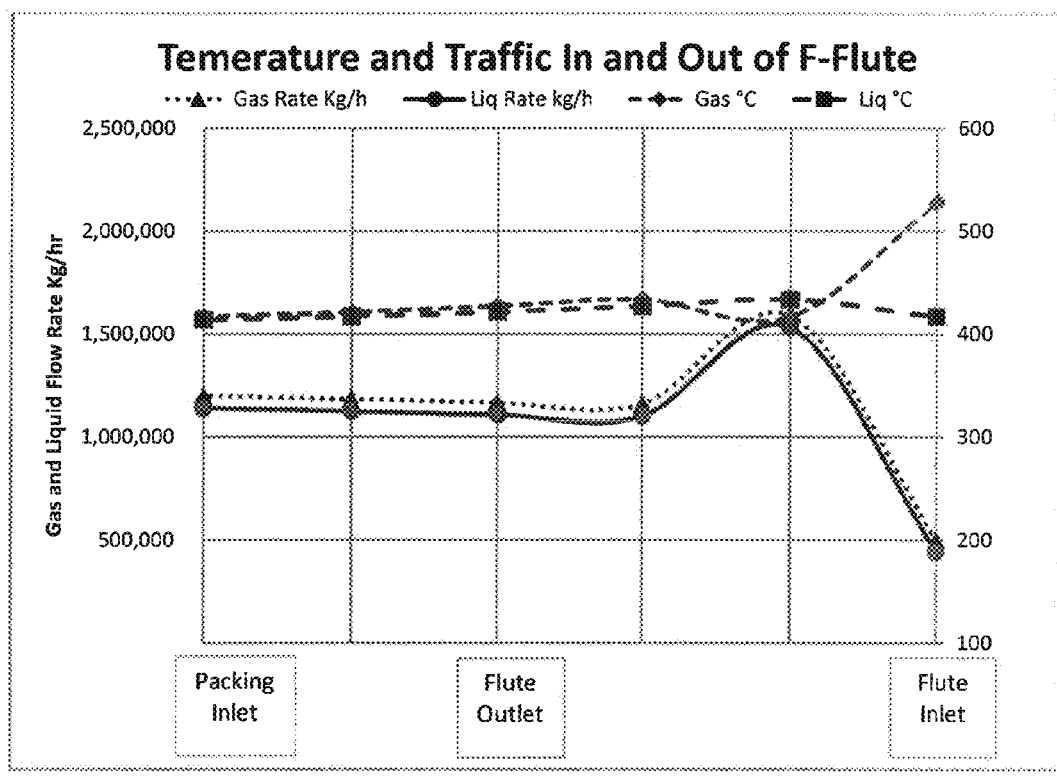
FIG. 5 is a graphic representation of the superheated feed gas and slurry liquid temperature (° C.) and the superheated feed gas and liquid flow rate in kg/hr at the packing inlet, gas distributor outlet (i.e., flute outlet), and gas distributor inlet (i.e., flute inlet).

FIG. 5 is a graphic representation of the superheated feed gas and slurry liquid temperature (° C.) and traffic (i.e., gas and liquid flow rate in kg/hr). The temperatures and flow rates are measured from the F-Flute gas distributor's inlet area, i.e., the superheated feed gas at gas inlet nozzle of FIG. 1A to the packing inlet. The simulated traffic and temperature of both slurry liquid (which enters the column 1 through slurry liquid distributor 44 of FIG. 1A) and superheated gas stream into and out of the F-Flute gas distributor. The graphic representation indicates that the superheated feed gas enters the claimed F-Flute gas distributor at a temperature of approximately 560° C. and is immediately quenched to approximately 420° C. inside the F-flute gas distributor's feed gas flow channel by evaporating the slurry liquid. Thus, the mass flow of gas increases from approximately from about 500,000 kg/hr to a maximum of approximately 1,600,000 kg/hr, and similarly the liquid rate increases and drops to approximately 1,100,000 kg/hr from 1,550,000 kg/he to 450,000 kg/hr. The gas from the superheated gas feed leaves the F-Flute gas distributor (flute outlet) at a rate of approximately 1,200,000 kg/hr and a temperature of approximately 410° C.

Figure 6:
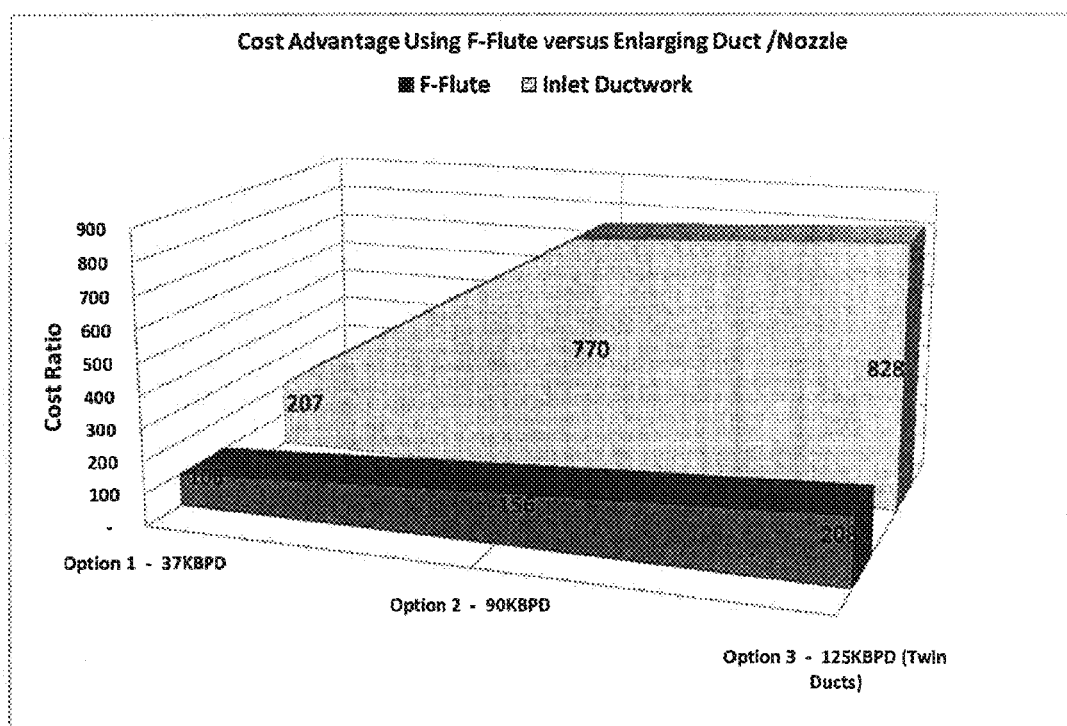
FIG. 6 is a graphic representation of the cost ratio for revamping three different size main fractionator towers, i.e., a 37 KBPD system, a 90 KBPD system, and 125 KBPD system with twin ducts, with the presently claimed F-Flute gas distributor.

FIG. 6 is a graphic representation of the cost ratio for revamping three different size main fractionator towers with the presently claimed F-Flute gas distribution of FIG. 1A. Conventional revamping of existing main fractionator towers require replacing the tower feed nozzle(s) and swaging a portion of the length of refractory line transfer line leading to the feed nozzle, of a length equivalent to 5-7 time the feed nozzle diameter, in proportional cross sectional area to the ratio of the revamp/original design capacity. This elaborate work can be avoided by installing the claimed F-flute gas distributor, since it provides an even distribution of the quenched superheated feed gas under the packing above the feed nozzle. The cost advantage as presented in FIG. 6 are significant using the claimed F-Flute gas distributor compared with replacing the feed nozzle and swaging the transfer line duct work, i.e., in a 37 thousand barrels per day ("KBPD") unit there is approximately 100% cost savings, in a 90 KBPD unit there is more than a 400% cost savings, and in a twin duct 125 KBPD unit there is an approximate 400% cost savings.

To show the improved gas distribution of the claimed F-Flute gas distributor of FIG. 1A, computational fluid dynamics (CFD) simulations were prepared, the results of which are presented FIGS. 7-11. The computational fluid dynamics simulations of FIGS. 7-11 illustrate three dimensional gas distribution velocity magnitude contours in the cross section of a main fractionator column. The simulations presented in FIGS. 7-10 illustrate gas distribution in the cross section of a main fractionator column 5 cm below the packing entrance with and without an F-Flute gas distributor, respectively. The feed gas inlet nozzle is positioned on the left side of each Figure, i.e., FIGS. 7-11. The computational fluid dynamics simulations were based on the claimed F-Flute gas distributor having the dimensions in millimeters (mm), as presented in FIG. 12. However, gas distribution can be improved for any size vessel when the presently claimed F-Flute design gas distributor is proportioned to accommodate the vessel.

Figure 7:
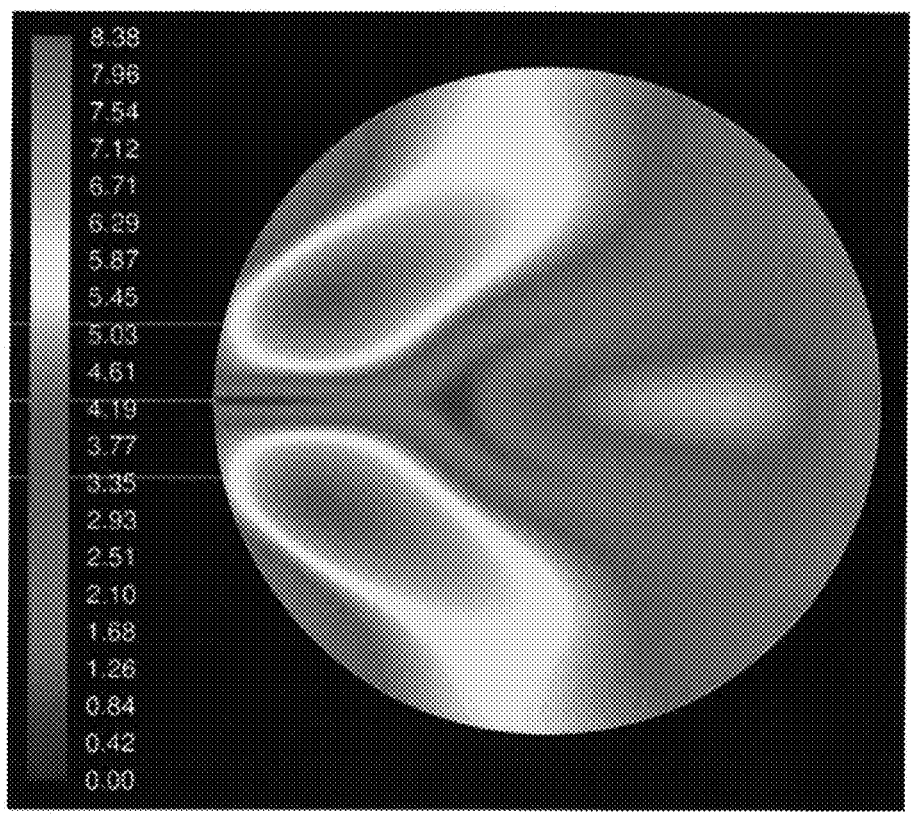
FIG. 7 illustrates a color computational fluid dynamics simulation of gas distribution velocity magnitude contours in the cross section of a main fractionator column below the packing entrance without an embodiment of the claimed F-Flute gas distributor.
Figure 8:
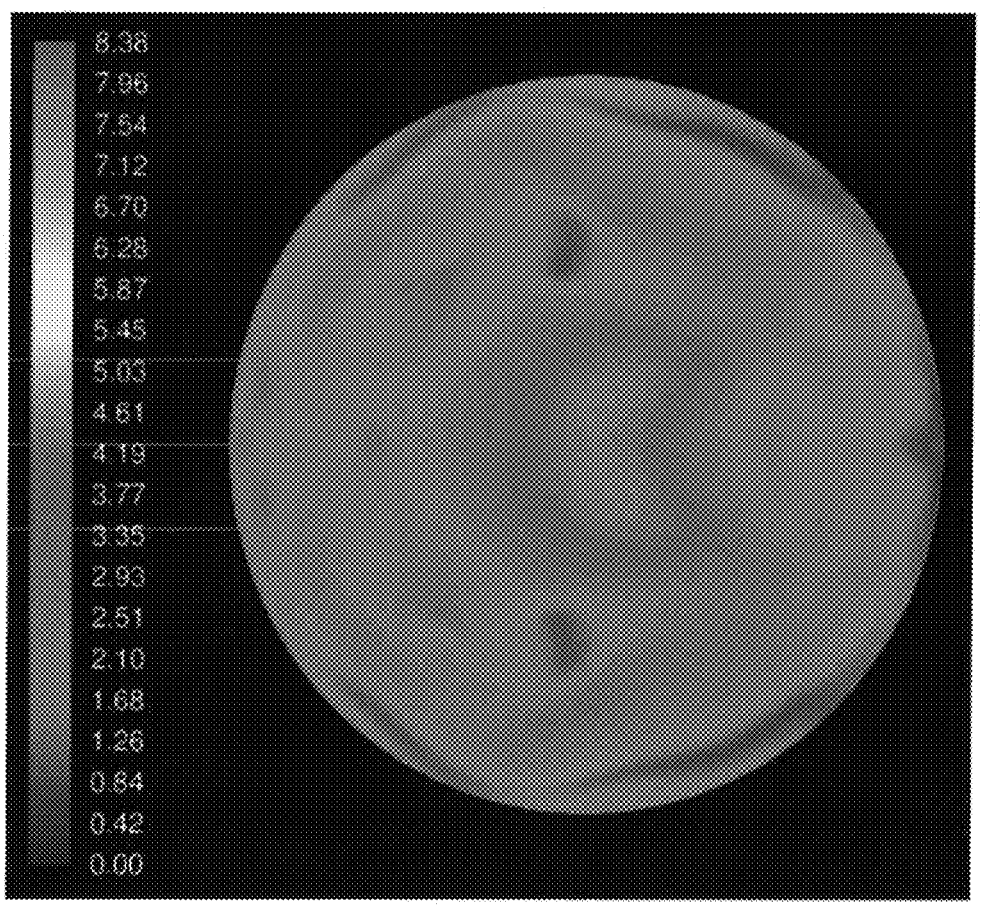
FIG. 8 illustrates a color computational fluid dynamics simulation of gas distribution velocity magnitude contours in the cross section of a main fractionator column below the packing entrance with an embodiment of the claimed F-Flute gas distributor.

FIG. 7 and FIG. 8 present CFD simulation models of gas distribution velocity magnitude contours of gas distribution (i.e., gas distribution patterns) in the cross section of a main fractionator column 5 cm below the packing entrance with and without the claimed F-Flute gas distributor, respectively. The comparison can be measured using peak to average velocity (PAV) levels. For FIGS. 7 and 8 the PAV levels range in numerical value from 0.00 to 8.38. The empty column, i.e., FIG. 7 absent the F-Flute gas distributor, has a PAV magnitude of 8.38 times the average velocity level. FIG. 7 displays prominent velocity magnitude contours illustrated by large oval contours with high PAV levels leaving the feed gas inlet nozzle and directed to the opposite sides of the fractionator column. The large oval contours are separated by a narrow velocity magnitude contour having a low PAV level. The pattern of the velocity magnitude contours in FIG. 7 indicate an extremely uneven velocity distribution of gas within the cross section of the column. However, the simulation of the column with the claimed F-Flute gas distributor, i.e., FIG. 8, has a PAV magnitude of 4.45 that is 47% lower than the empty column. The substantially even velocity magnitude contours within the cross section of the column presented in FIG. 8 are illustrated by the uniformity of the contours displayed and the absence of high PAV levels.

Figure 9:
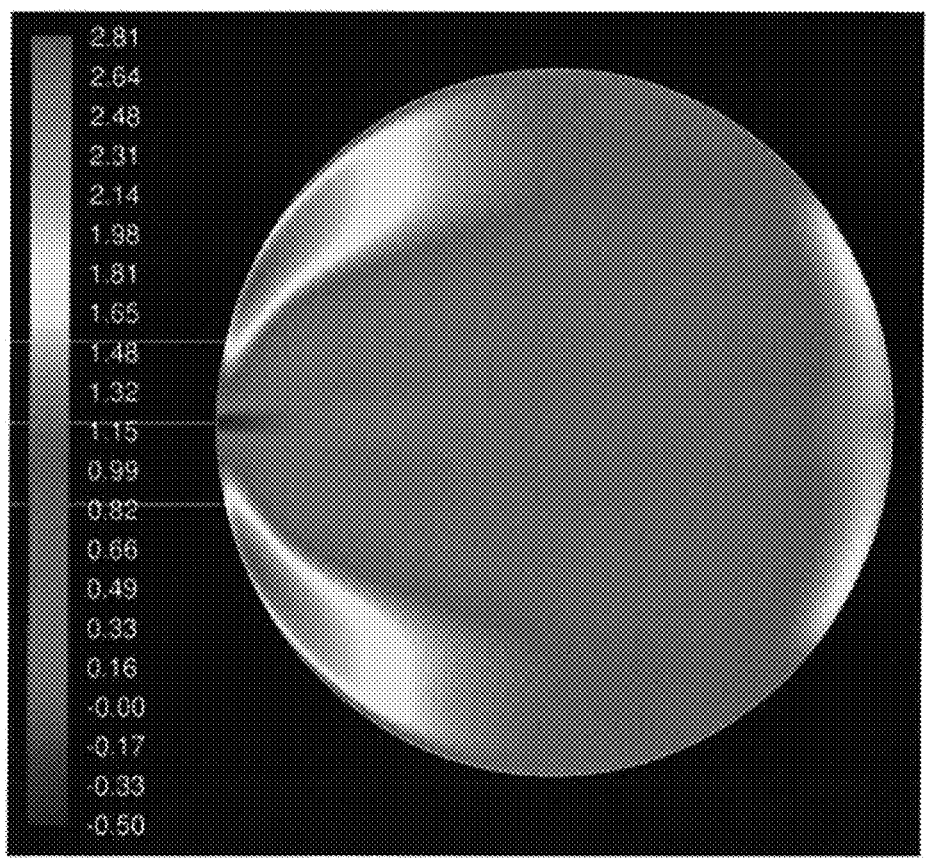
FIG. 9 illustrates a color computational fluid dynamics simulation of gas distribution vertical velocity magnitude contours in the cross section of a main fractionator below the packing entrance without an embodiment of the claimed F-Flute gas distributor.
Figure 10:
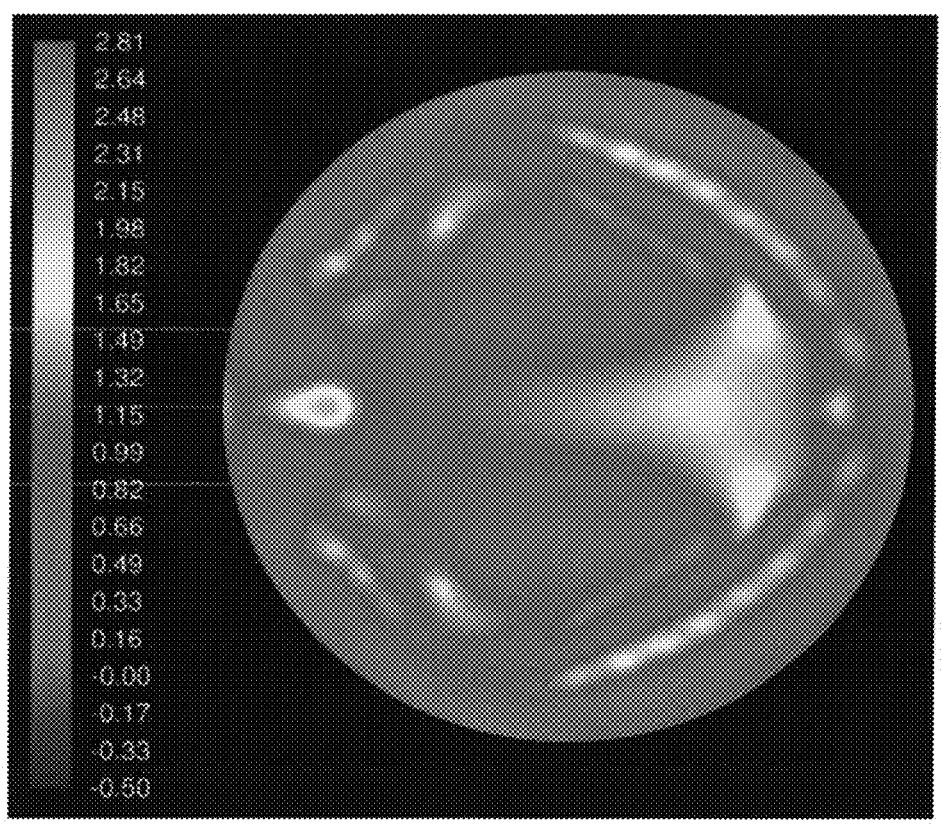
FIG. 10 illustrates a color computational fluid dynamics simulation of gas distribution vertical velocity magnitude contours in the cross section of a main fractionator below the packing entrance with an embodiment of the claimed F-Flute gas distributor.

FIGS. 9 and 10 are CFD simulation models of vertical gas distribution velocity magnitude contours (i.e., gas distribution patterns) at 5 cm below the packing of the column. FIG. 9 indicates the vertical gas distribution velocity magnitude contours for the empty column, i.e., absent the claimed F-Flute gas distributor, and FIG. 10 presents the vertical gas distribution velocity magnitude contours for the column with the claimed F-Flute gas distributor installed. The PAV levels range in numerical value from −0.50 to 2.81. The simulation of the empty column in FIG. 9 measures a PAV vertical component at 2.8 times the average velocity level illustrated by significant oval velocity magnitude contours having high PAV levels leaving the feed gas inlet nozzle and directed to the opposite sides of the fractionator column. These vertical velocity magnitude contours indicate an extremely uneven velocity distribution of gas below the packing of the column. The column in FIG. 10 with the F-Flute gas distributor, however, measures a PAV vertical component of 2.1 that is 25% lower than the empty column. The simulation models clearly indicate that the claimed F-Flute gas distributor improves the velocity uniformity, and thus improves gas distribution to the packing area when installed.

Figure 11:
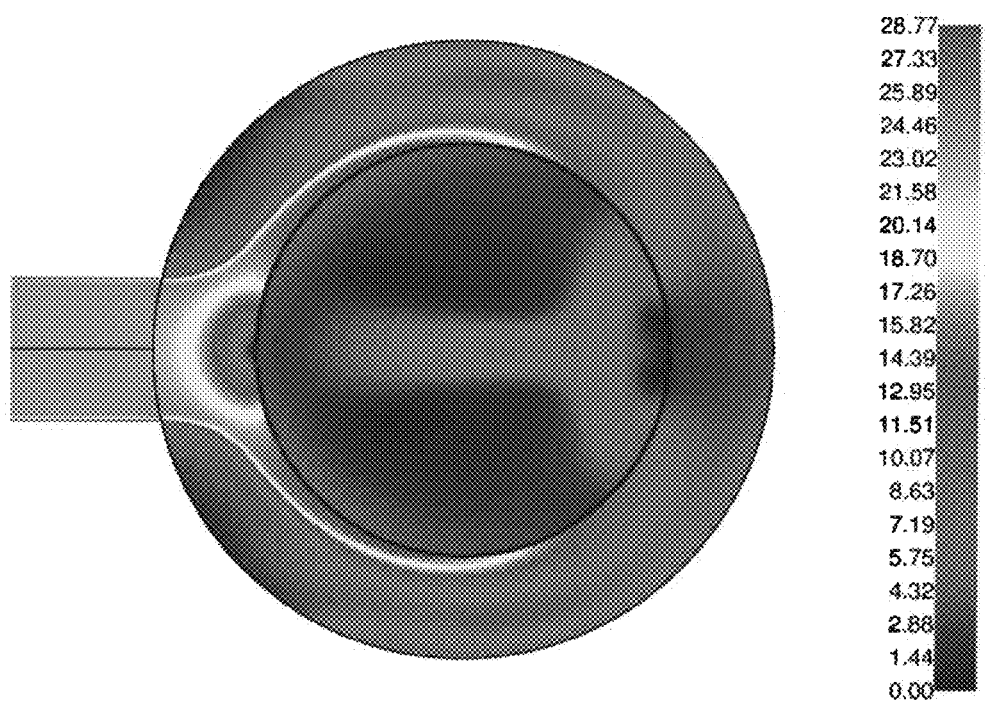
FIG. 11 illustrates a color computational fluid dynamics simulation of gas distribution velocity magnitude contours with an embodiment of the claimed F-Flute gas distributor at feed gas inlet nozzle level.
Figure 12:
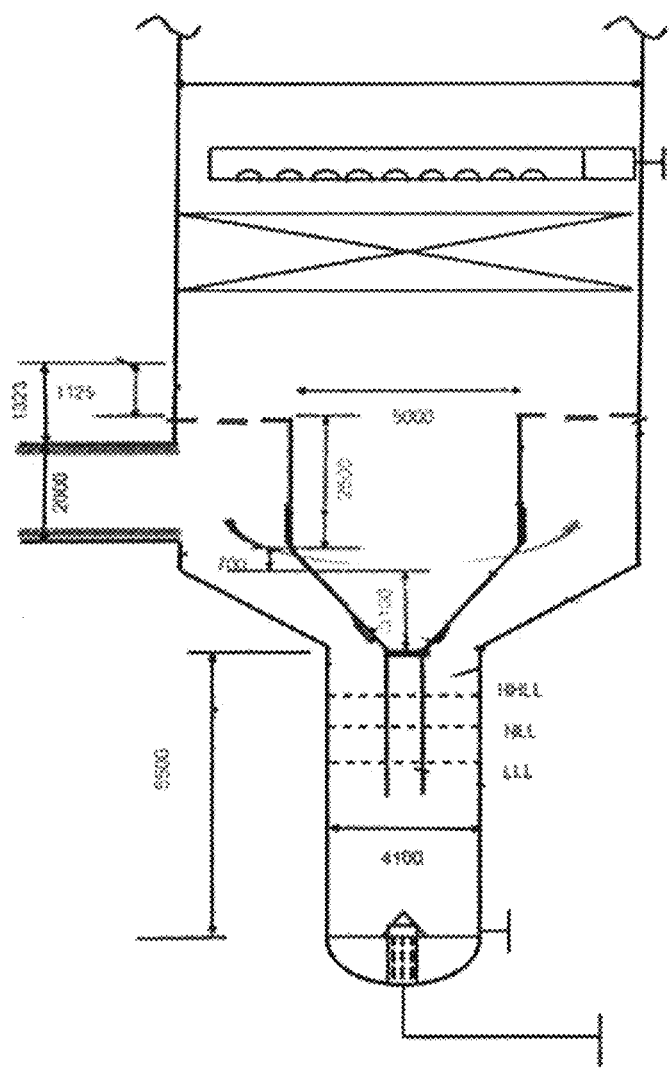
FIG. 12 is a cross-section view the claimed gas distributor having an F-Flute design with exemplary dimensions in millimeters and marking indicating high high liquid level (HHLL), high liquid level (HLL), and low liquid level (LLL) positions.

FIG. 11 is a CFD simulation model illustrating superheated feed gas velocity magnitude contours (i.e., gas distribution patterns) inside an F-Flute gas distributor of the present claimed invention at the feed gas inlet nozzle level. This simulation clearly indicates uniform velocity magnitude contours over the majority of the feed gas flow channel and interior open area of the claimed F-Flute gas distributor.

Additionally, the claimed F-Flute gas distributor will enhance heat and mass transfer by reducing the Sauter mean diameter (SMD) of the droplet distribution. Estimates based on aerodynamic breakup, indicate that the SMD of droplets inside the F-Flute gas distributor will be 33% smaller than in a column without the F-Flute gas distributor. This increases the interfacial surface area between liquid and gas to increase heat and mass transfer.

The following Table 1 presents the estimated difference in SMD and heat transfer with and without the F-Flute gas distributor of FIG. 1A.

TABLE 1

| Design | SMD- mm | Heat Transfer - Watt/° K |
|---|---|---|
| Empty Colum | 4.0 | 4.2 E 05 |
| F-Flute gas distributor 10 | 2.7 | 5.5 E 05 |

The plurality of vent windows in the F-Flute gas distributor are positioned throughout the interior cylindrical deflector and the wall and chimneys positioned throughout the ceiling, allow for the cooled separated superheated feed gas to exit the distributor into the column's interior fill cross section open area with greatly slowed and uniform velocity for distribution to packing or trays located within the column and above the F-Flute gas distributor.

The walls of the F-Flute gas distributor, i.e., interior cylindrical deflector wall, cone shape bottom section that extends the interior cylindrical deflector wall and the interior side of column shell wall, which comprises the exterior wall of the F-Flute gas distributor, are entirely wetted with slurry liquid. The interior cylindrical deflector wall, bottom section, and interior side of column shell wall are completely wetted because the ceiling is connected to the interior cylindrical deflector wall and the interior side of column shell wall through a connection device, such as, a dowel, circular rim, welded rod or bracket, and the like, to include a plurality of openings so that the slurry liquid can fall vertically down the interior cylindrical deflector wall, bottom section, and interior side of column shell wall and keep them wetted.

Any condensation of high boiling point components of the super-heater feed gas components inside the F-Flute gas distributor will occur in the liquid slurry phase and will immediately mix and washed down with the flowing slurry liquid to the column sump of the MF column. This will prevent the condensed droplets of the superheated feed gas containing asphaltenes from sticking to the solid wall surfaces and being exposed for lengthy periods to hot superheated feed gas which is the main cause of coke particles formation and their growth that caused failure of the prior art gas distribution devices.

Additionally the expansion of the superheated feed gas from the feed gas inlet nozzle together with the showering of the slurry liquid from the ceiling sections inside the F-Flute gas distributor provides a vehicle for the solid catalyst fines to separate out of the superheated feed gas and be carried with the large flow of slurry liquid down to the column sump without causing erosion problems to the column walls and internals. If the solid catalyst fines and coke particle are not efficiently separated from the superheated feed gas at point of entry to the column and pass with the superheated feed gas to the slurry packed section and deposit on its packing, the column's efficiency to cool the feed gas is reduced. Moreover, the column requires more frequent cleaning for the removal of the solid catalyst fines and coke particle.

Further, the presently claimed F-Flute gas distributor has been shown to decrease significantly the maximum local gas velocity below the packing in the portion of the column situated above the F-Flute gas distributor, i.e., cooled superheated feed gas in the interior full cross section open area. This reduction in local gas velocity results in a more uniform distribution of gas pressure and ultimately a more efficient heat transfer in the slurry section as well as better fractionation in the upper column sections. An even distribution of the gas on the packing and trays is critical for proper heat and mass transfer. Even distribution can be accomplished for a higher degree of heat exchange and fractionation through the use of the F-Flute gas distributor of the present invention, which allows the conventionally designed capacity profile of a given mass and/heat transfer column/MF column to be exceeded well beyond its traditionally accepted limitations. This results in higher capacity within the same column relative to similar devices that do not employ the gas distribution device of the present invention. The F-Flute gas distributor of the present invention would significantly decrease the maximum local velocity below a packing or tray in a column and therefore improve the velocity profile below the packing/tray.

The invention further provides lower temperature of the gas flow to the packed slurry section as well as more even distribution, these two factors result in reduction in the required column diameter. The more even distribution of bottom gas to the tower sections above improve the column internals efficiency for heat and mass transfer and leads to a reduction in the overall column height.

The novel features of the present invention have been shown to produce this uniform distribution of gas pressure at a level above any known prior art gas distributor. The presently claimed F-Flute gas distributor provides a low column skin temperature by cooling the feed gas first with the showering slurry liquid at entry to the column inside the F-Flute gas distributor.

The claimed gas distributor reduces or eliminates "jetting" of the superheated feed gas, whereby the superheated feed gas hits the column wall creating dry spots and causes the column wall to reach temperatures above the design temperature of the column shell. In this regard, the claimed F-Flute gas distributor also avoids column shell (i.e., wall)

erosion by eliminating the jetting effect of the superheated feed gas containing the erosive catalyst fines that continuously and at high velocities impinge the column wall and cause local erosion and/or thinning of the column shell in area directly opposite to the feed nozzle. The use of the claimed F-Flute gas distributor will remove the catalyst fines by the showering slurry liquid inside the F-Flute gas distributor and there will be no direct contact of the superheated feed gas with the column shell wall.

Although the present invention has been described in considerable detail with regard to certain versions thereof other versions are possible, and alterations, permutations, and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

We claim:

1. A method for distributing feed gas in a heat exchange and/or mass transfer column, said method comprising the steps of:
   delivering a superheated feed gas through a feed gas inlet nozzle that extends through a shell wall of the column substantially perpendicular to the longitudinal axis of the column and directing the feed gas perpendicularly to a substantially vertical interior cylindrical deflector wall having a bottom section that extends the interior cylindrical deflector wall and conforms to the contour of the shell wall and at least one opening to an annular interior open area within the column, said bottom section comprising a bottom section opening to a column sump within the column, and a generally horizontal ceiling above the inlet nozzle between the shell wall and the interior cylindrical deflector wall to define a generally circumferential gas flow channel formed between the shell wall and the interior cylindrical deflector wall, said ceiling having a plurality of openings;
   cooling the superheated feed gas by contacting the gas with a counter current flow of liquid as the liquid passes through the plurality of openings in the ceiling and into the circumferential gas flow channel;
   wetting the interior cylindrical deflector wall and an interior side of the shell wall that forms the circumferential gas flow channel with the counter current flow of liquid after the liquid has passed through the plurality of ceiling openings; and
   venting the superheated feed gas to an area above the ceiling and the annular interior area within the column through the at least one opening of the interior cylindrical deflector wall and the plurality of openings in the ceiling to provide a substantially uniform distribution of the superheated feed gas within the column.

2. The method of claim 1, wherein the feed gas flow rate increases from about 500,000 Kg/h upon entering the gas flow channel to about 1,200,000 Kg/h upon leaving the plurality of openings in the ceiling and the at least one opening of the interior cylindrical deflector wall.

3. The method of claim 1, wherein the feed gas temperature decreases from about 560° C. upon entering the gas flow channel to about 420° C. upon leaving the plurality of openings in the ceiling and the at least one opening of the interior cylindrical deflector wall.

4. The method of claim 1, wherein there is a plurality of openings between the ceiling and the interior cylindrical deflector wall and the ceiling and the shell wall.

5. The method of claim 1, wherein the bottom section is cone shape.

6. The method of claim 1, wherein the column is a main fractionator column.

7. The method of claim 1, wherein the column further comprises packing and/or trays above the gas distributor.

8. The method of claim 1, wherein the ceiling comprises at least one ceiling section.

9. The method of claim 8, wherein at least one ceiling section is a flat plate.

10. The method of claim 1, wherein the ceiling section comprises at least one chimney.

11. The method of claim 8, wherein the ceiling section comprises rods spaced at least about 1 inch apart.

12. The method of claim 8, wherein the ceiling section is corrugated.

13. The method of claim 1, wherein there is a plurality of openings between the ceiling and the interior cylindrical deflector wall and the ceiling and the shell wall.

14. The method of claim 8, wherein the ceiling section is at least one selected from the group consisting of a flat plate with at least one chimney, a section comprising rods spaced at least about 1 inch apart, and a corrugated ceiling section with at least one chimney.

15. The method of claim 1, wherein the opening of the cylindrical deflector wall is a vent window.

16. The method of claim 1, wherein the bottom section further comprises at least one overflow opening.

17. The method of claim 1, wherein segmented interior cylindrical deflector wall segments are sized to fit through a manway.

18. The method of claim 8, wherein the ceiling sections are sized to fit through a manway.

19. The method of claim 1, wherein the bottom section comprises bottom section segments.

20. The method of claim 10, wherein the chimney comprising a high hat.

21. A method for distributing feed gas in a heat exchange and/or mass transfer column, said method comprising the steps of:
   delivering a superheated feed gas through a feed gas inlet nozzle that extends through a shell wall of the column into a generally circumferential gas flow channel formed between the shell wall, an interior cylindrical deflector wall having a bottom section and at least one opening to an annular interior open area within the column, and a ceiling above the inlet nozzle between the shell wall and the interior cylindrical deflector wall, said ceiling having a plurality of openings;
   cooling the superheated feed gas by contacting the gas with a counter current flow of liquid as the liquid passes through the plurality of openings in the ceiling and into the circumferential gas flow channel;
   wetting the interior cylindrical deflector wall and an interior side of the shell wall that forms the circumferential gas flow channel with the counter current flow of liquid after the liquid has passed through the plurality of ceiling openings; and
   venting the superheated feed gas to an area above the ceiling and the annular interior area within the column through the at least one opening of the interior cylindrical deflector wall and the plurality of openings in the ceiling to provide a substantially uniform distribution of the superheated feed gas within the column.

* * * * *